Figure 1:
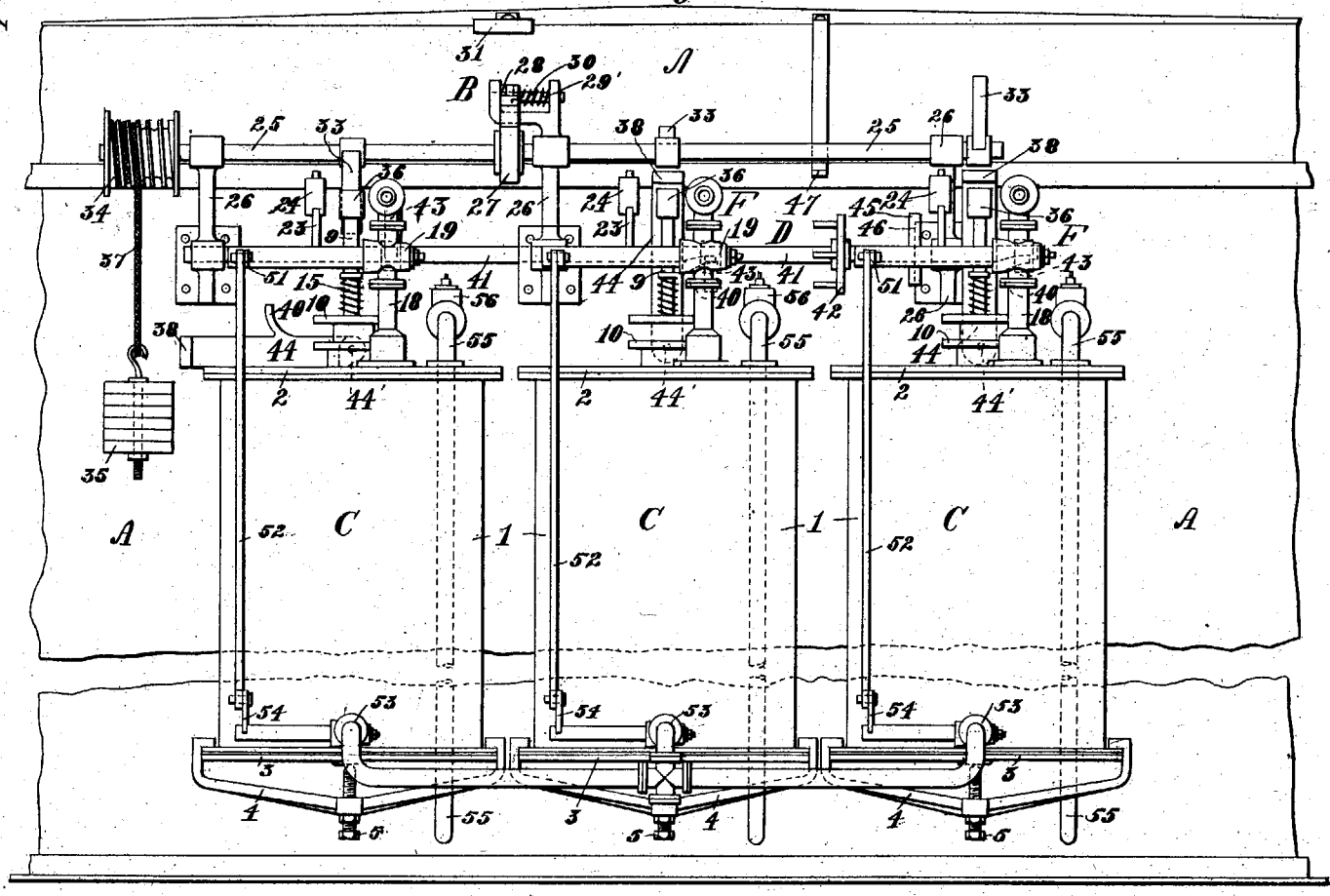

No. 12,041. Reissued Sept. 30, 1902.

G. G. SMITH.

ACETYLENE GAS GENERATOR.

(Application filed Jan. 27, 1902.)

4 Sheets—Sheet 1.

Witnesses:
Frederick C. Zeigler
F. E. Maynard.

Inventor:
George Gregory Smith.
By his Attorney.
F. H. Richards.

THE NORRIS PETERS CO., PHOTO-LITHO., WASHINGTON, D. C.

No. 12,041. Reissued Sept. 30, 1902.

G. G. SMITH.

ACETYLENE GAS GENERATOR.

(Application filed Jan. 27, 1902.)

4 Sheets—Sheet 2.

Witnesses:
Frederick O. Zeigler
F. E. Graupner

Inventor:
George Gregory Smith
By his Attorney
F. H. Richards.

THE NORRIS PETERS CO., PHOTO-LITHO., WASHINGTON, D. C.

No. 12,041. Reissued Sept. 30, 1902.

G. G. SMITH.

ACETYLENE GAS GENERATOR.

(Application filed Jan. 27, 1902.)

4 Sheets—Sheet 3.

Witnesses:
Frederick C. Zeigler
F. E. Maynard.

Inventor:
George Gregory Smith.
By his Attorney.
F. A. Richards.

THE NORRIS PETERS CO., PHOTO-LITHO., WASHINGTON, D. C.

No. 12,041.
Reissued Sept. 30, 1902.
G. G. SMITH.
ACETYLENE GAS GENERATOR.
(Application filed Jan. 27, 1902.)
4 Sheets—Sheet 4.
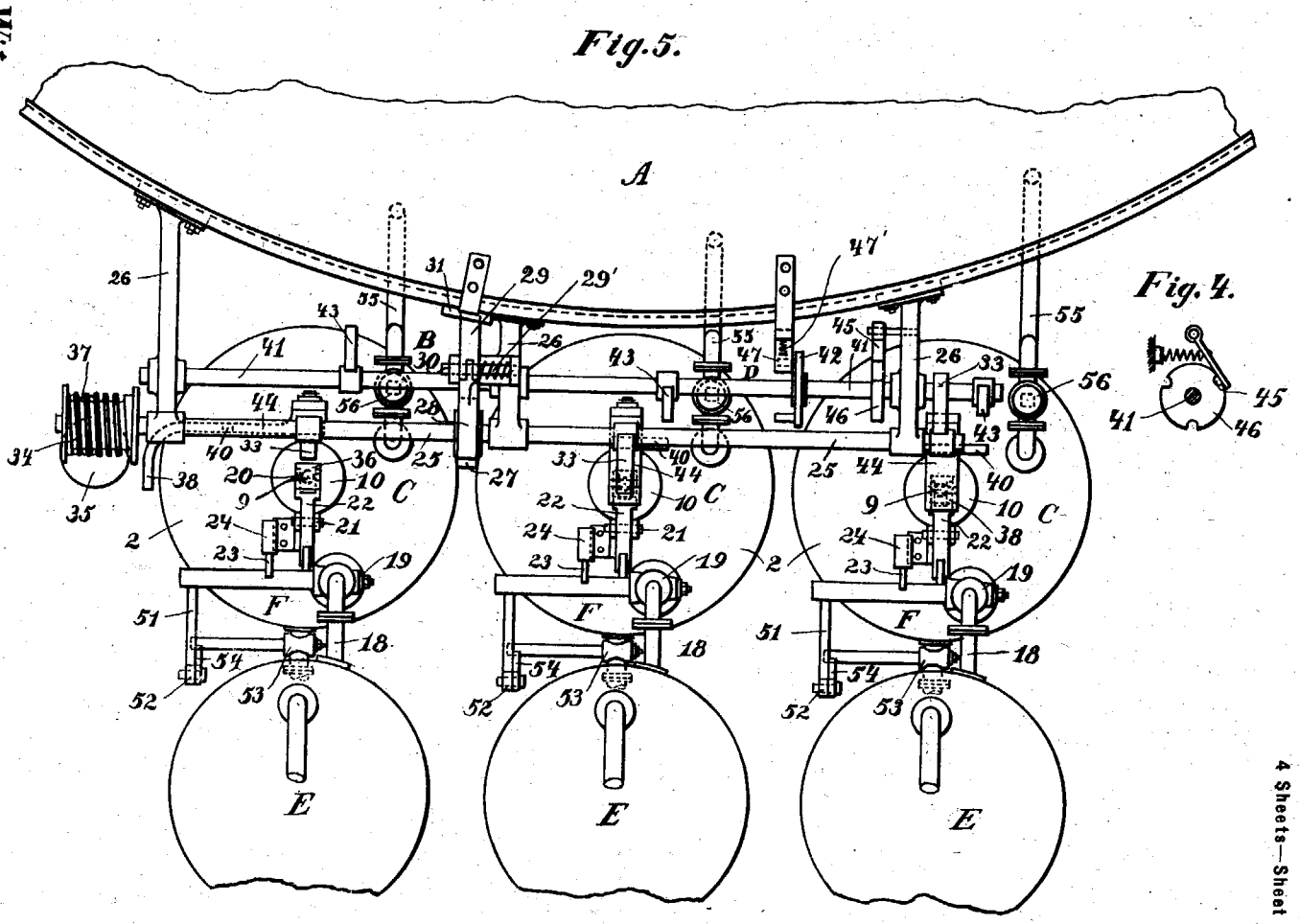
Witnesses:
Frederick O. Zeigler
F. C. Maynard
Inventor:
George Gregory Smith
By his Attorney
F. A. Richards.
THE NORRIS PETERS CO., PHOTO-LITHO., WASHINGTON, D. C.

UNITED STATES PATENT OFFICE.

GEORGE GREGORY SMITH, OF FLORENCE, ITALY.

ACETYLENE-GAS GENERATOR.

SPECIFICATION forming part of Reissued Letters Patent No. 12,041, dated September 30, 1902.

Original No. 660,169, dated October 23, 1900. Application for reissue filed January 27, 1902. Serial No. 91,536.

*To all whom it may concern:*

Be it known that I, GEORGE GREGORY SMITH, attorney at law, a citizen of the United States, residing at San Domenico, Florence, in the Kingdom of Italy, have invented certain new and useful Improvements in Acetylene-Gas Generators, of which the following is a full, clear, and exact description.

The present invention relates to gas-generators; and its object is, among other things, to provide an apparatus which will work continuously and with absolute safety, producing consecutively even quantities of dry gas without intermediate interruption and without any appreciable pressure variation.

Another object of the invention is to provide in a gas-generating apparatus a receptacle or generator-chamber adapted to contain a case of gas-producing agent, which case is capable of being punctured or otherwise opened at two points, and mechanism in connection therewith and operated by the falling of the bell or movable part of the gas-holder to or below a predetermined point for opening the case at a point where water or other coöperating gas-producing agent may freely enter the case and at a point where the gas generated within the case may freely escape.

Another object of the invention is to provide mechanism for admitting to the receptacle or generator-chamber a sufficient quantity of water or other coöperative gas-producing agent to generate the carbid or other gas-producing agent within the case and suitable mechanism for causing the supply of the coöperative agent to enter the receptacle at or about the time the case is opened.

Another object of the invention is to provide punches for puncturing the upper and the lower portions of a case within a closed receptacle and for automatically withdrawing the punches from the case.

Another object of the invention is to provide means for supplying a generator-receptacle with water or other fluid at a predetermined time and means for draining the receptacle of fluid which may accidentally enter the same before it is required and means connected with the device for admitting the supply of fluid after closing such draining means.

Another object of the invention is to provide efficient mechanism operated by the reduction of volume of gas within a gas-holder for setting in operation the case-opening devices and the fluid-supply devices.

Another object of the invention is to provide a series of receptacles or generator-chambers adapted to contain cases of gas-producing agent and mechanism operated by the successive reduction of the volume of gas within the holder for opening the cases consecutively, permitting the coöperative agent to come into gas-producing contact therewith, the various parts of the apparatus being organized, arranged, and coöperating in such a manner as to enable the receptacles to be recharged with the gas-producing agent at any time while the apparatus is at work. Provision is also made for stopping the generation of gas in the event of any part of the mechanism for consecutively bringing the gas-producing agents into contact becoming defective.

In order to render the present specification easily intelligible, reference is had to the accompanying drawings, in which similar letters and numerals of reference denote similar parts throughout the several views.

Figure 2:
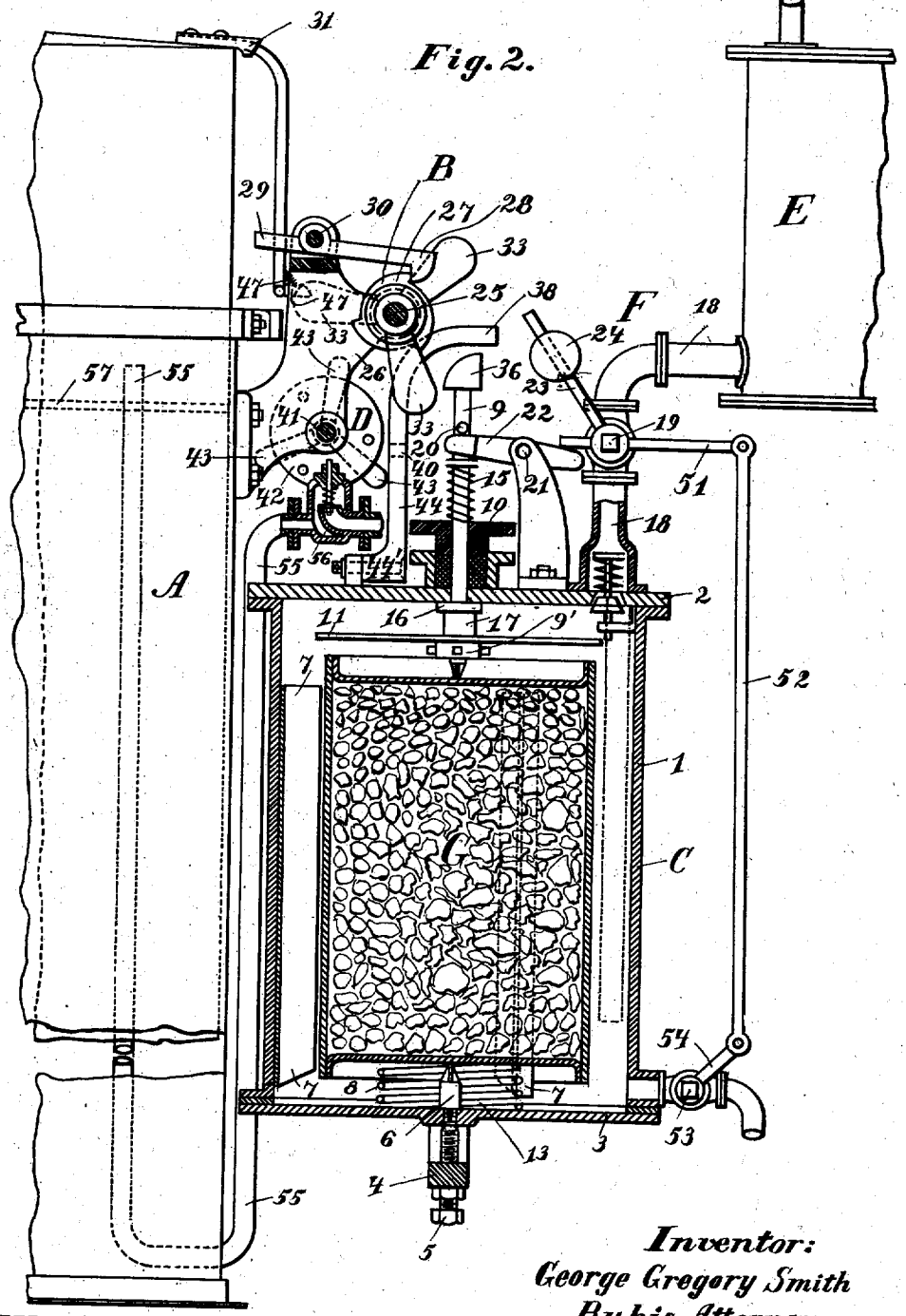
Figure 3:
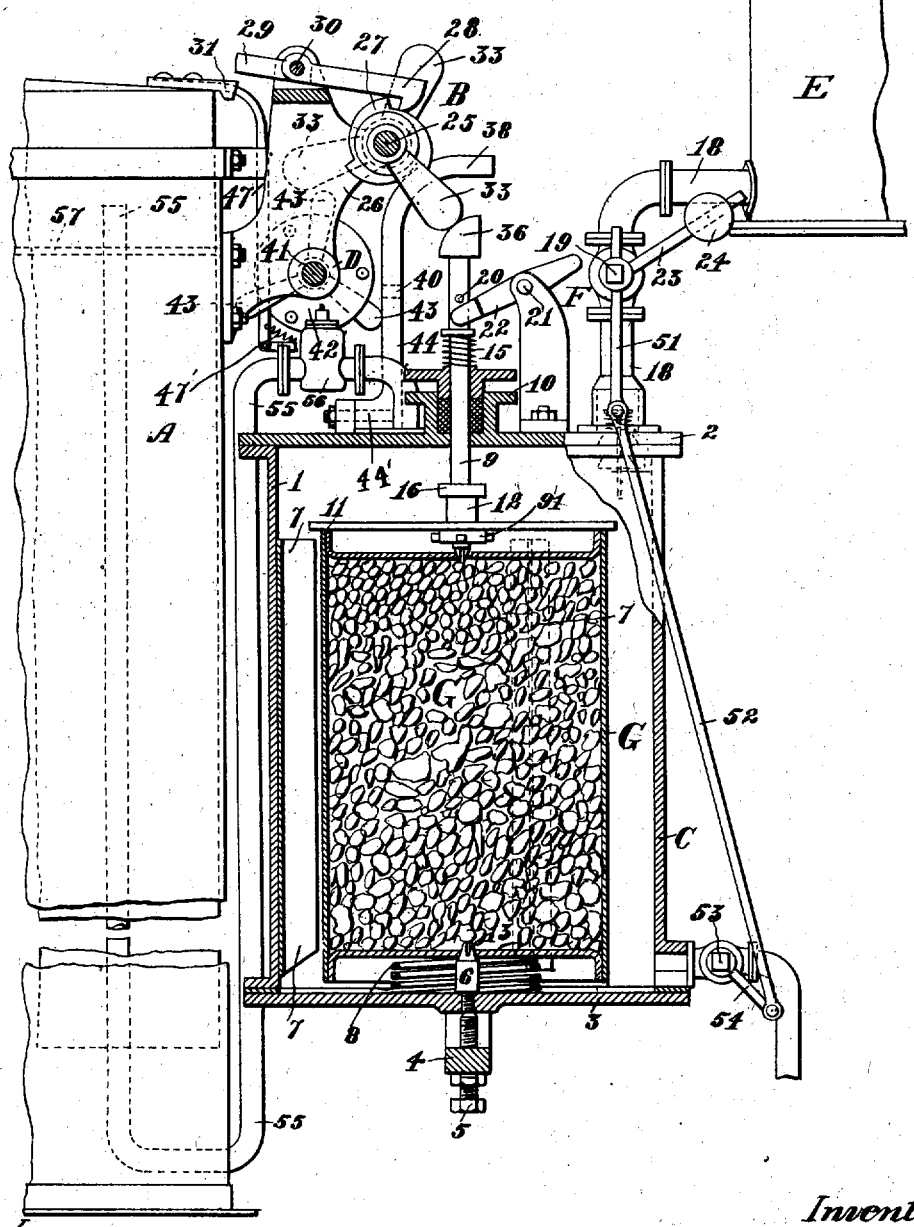

Figure 1 is a front elevation of the apparatus. Fig. 2 is a sectional side elevation. Fig. 3 is a similar side elevation showing the tin or can containing the gas-producing agent punctured and all parts in the corresponding position; Fig. 4, a detail end elevation showing means for arresting the controlling-shaft in its proper position, and Fig. 5 is a plan of the whole apparatus.

Generally, A represents a gas-holder; B, a device for consecutively operating and controlling opening mechanism; C, receptacles or generator-chambers; D, mechanism for controlling a part of the apparatus; E, water-tanks; F, mechanism for controlling the water-supply, and G cases containing gas-producing agent.

According to the system of gas generation on which the present construction is based each receptacle C is provided with a certain quantity of material sufficient when developed to approximately fill the bell of the gas-holder. When the gas in the bell supplied by one receptacle has been almost exhausted, the downward movement of the said bell operates a weighted shaft, causing water to be admitted to the next receptacle, by means of which sufficient gas is generated to approximately refill the bell, which rises again. Thus each complete descent of the bell brings another receptacle into operation, while the previously-exhausted receptacle may be recharged without in any way interfering with the working of the apparatus, and if the receptacles are charged consecutively as they are exhausted the apparatus will automatically start the first receptacle into action after the last of the series has been exhausted. When carbid is employed as a gas-producing agent, the receptacle, generator-chamber, or holder C is constructed in the following manner: The cylinder 1 is provided with an air-tight closed cover 2 at the top and a removable bottom plate 3, which is secured by means of a bow 4, which grips over the lower cylinder-flange and has a clamping-screw 5, which holds the bottom plate securely in position, a suitable packing-ring being interposed between the plate 3 and the lower flange of the cylinder. At about the center of the bottom plate an upwardly-projecting punch 6, having vertical grooves 13, is provided and surrounded by a coiled spring 8, on which the holder of case G rests, the holder or case being advantageously centered by means of inwardly-projecting flanges 7. The spring 8 is adjusted to support the charged case with its bottom just above the top of the punch 6. The cover 2 of the holder is provided with a stuffing-box and gland 10, in which a rod 9, having a downwardly-pointed punch for the top of the case, is provided. The rod 9 carries a flange or collar 16, fast thereon, within the receptacle, the said collar acting as a stop for the upward movement of the rod and also to support a flange 11 by means of its downwardly-extending sleeve-like part 17 and lower collar 9′. This rod is normally held with its collar 16 against the inner surface of the cover 2 by means of a spring 15, interposed advantageously between a collar on the spindle and the top of the gland 10 of the cover. The flange 11 is shown as slightly larger than the exterior diameter of the case, so that if the rod 9 is compressed the punch on the latter will first puncture the cover of the case G, and as the rod still descends the flange 11 will force the whole holder downwardly against the action of the coiled spring 8 onto the punch 6, which also punctures the bottom of the said case. As soon as the pressure on the rod 9 ceases and the latter is released the spring 8 raises the tin from the punch 6, while the spring 15 returns the rod 9, and with it the flange 11, to its normal position, raising the punch end of the rod out of the puncture in the top of the case, so that water is free to enter the said case at the lower opening and to generate gas in the known manner, which gas may escape by the upper opening.

The water-feed is operated by the downward movement of the rod 9 in a manner which will now be described with reference to Figs. 2 and 3. As previously stated, each receptacle or generator C is provided with a water-tank E, advantageously mounted on a higher level than the receptacle and in communication therewith by means of a pipe 18, having a stop-cock 19 and leading through the cover 2. Each water-tank is to contain sufficient water to fill the receptacle around the carbid-case to a level slightly above the top of the case. The rod 9 is provided with a laterally-extending pin or notch 20, which when the rod descends under the influence of the blow turns a lever 22, pivotally mounted on the cover at 21, and tilts over the cock-lever 23, the weight 24 of which falls on the other side and completely opens the water-cock, allowing the contents of the tank E to flow into the receptacle C. A back-pressure valve may be provided between the cock and the receptacle 1 to prevent the flow of gas back to the water-tank, or, as indicated by dotted lines in Fig. 2, the pipe 18 may be prolonged downwardly into the holder, and thus will be sealed by the water in the latter.

The mechanism for actuating the punches is shown as embodying means for imparting a blow to each rod 9 consecutively, one rod receiving its blow at each descent of a gasometer-bell, is constructed and arranged in the following manner: A rotary shaft 25 is supported in bearings 26 and carries at a suitable point in its length a drum 34, having cord 37, with weight 35. The receptacles or generator-chambers C, as indicated at Fig. 5, are advantageously disposed in a row in proximity to the said shaft 25. Each rod 9 is provided with a cam-surface 36 at the top adapted to be struck by an arm or wiper 33, keyed to the shaft 25, when the latter is released and allowed to turn under the pull of the weight 35. One striker-arm 33 is provided above each rod 9, and the cam-surfaces are of such a nature that the striker-arm after having delivered the blow slides past the cam 36 as the rod 9 descends far enough. The wiper or striker arms 33 are radially disposed around the shaft 25 at equal angles one from the other, so that when the striker-arm of the the first holder has delivered its blow that of the next holder will have come around in position to deliver its blow the next time the shaft is released—*i. e.*, the next time the bell descends. The intermittent partial rotation of the shaft 25 is effected and controlled by means of a ratchet-wheel 27, fast on the said shaft, and a balance-like ratchet or pawl device 28, pivoted at 30 and having an upwardly-movable tail 29, extending into the path of movement of a trip-lug 31, suitably mounted on the gasometer-bell of the gas-holder and adapted to trip the pawl and release the shaft for a moment when the bell has just reached its lowest position or immediately before the lowest point has been attained, Fig. 3. The tail 29 is hinged to the pawl 28 and normally held in the position shown at Fig. 3 by means of a spring 29′, as will be clearly seen at Fig. 5. Thus when the bell rises after a carbid-case has been punctured the trip-lug 31 will push the tail 29 up and slide past it.

This invention is not confined to the particular mechanism for releasing the shaft for a moment, as any suitable known means may be employed.

In order to prevent accidents which might arise in the event of the pawl-and-ratchet mechanism breaking down and the shaft 25 being thus permitted to make a complete revolution and discharge all the receptacles or holders simultaneously, each rod 9 is provided with a protecting-cap, which wards off the striker-arm and prevents the operation of the rod 9 until the said protecting-cap has been tilted out of the way by the descent of the bell. Referring to Fig. 5, a shaft or spindle 41 is mounted parallel to the shaft 25 and in proximity thereto, the said shaft having mounted thereon a crown-wheel 42, the pins of which correspond in number to the number of carbid-holders. This shaft further carries a disk 46, having recesses in its periphery, into which the rounded head 45, Fig. 4, of a pivoted lever is spring-pressed for the purpose of determining the proper position of the shaft after each partial movement of the same. A finger 47 on the bell acts on one of the pins of the crown-wheel 42 at each descent of the bell and turns the shaft a part of a revolution. This finger yields downwardly as the bell rises, being normally returned to the horizontal position by means of a spring 47′, which holds it against a suitable stop. A series of arms or wipers 43 is arranged on the shaft 41 in a similar manner to the striker-arms 33 of the shaft 25. The tails 40 of pivoted levers 44 extend into the path of movement of each arm 43 and are actuated by the said arms to tip back the protecting-caps 38, so that they can fall down onto the cover and leave the cam-surface of each rod 9 free to be operated by its striker-arm. The levers 44 are pivoted at 44′ to the top of the carbid-holders and are bent around at the top to form a protecting-cap 38, overreaching the cam at the top of rod 9. These levers stand loosely, as shown at Figs. 2 and 3, normally, and when the corresponding arm 43 of the shaft 41 moves it comes up under the lug 40 and knocks the lever over into the position shown at the left-hand side of Fig. 1, leaving the top of the rod 9 free. Thus each time the bell descends the finger 47 of the same will operate the shaft 41 to tilt down a protecting-cap immediately before the trip 31 releases the shaft 25. Thus it will be seen that if the pawl mechanism of the shaft 25 were to get deranged after one striker-arm had operated the punches the shaft could only turn far enough to allow the next striker-arm to strike and remain on the protecting-cap of the next rod, without, however, throwing the same into operation.

The device operates in the following manner: The receptacles having been charged each with a case of carbid and again closed, the first holder may be operated by hand, in that the pawl 28 is raised by hand and liberates the puncturing mechanism and the water-feed. As the gas is developed the bell rises, and when the gas is consumed it gradually sinks again. When the bell has nearly attained its lowest point, the stop or lug 47 turns the shaft 41 by means of its contact with the crown-wheel 42 and throws over the protecting-cap 38 of the second carbid-holder. The moment afterward the lug 31 reaches the pawl-tail 29, tripping the pawl and releasing the shaft 25, which will now turn a third of a revolution and operate the puncturing device of the second holder, when it will again be arrested by the pawl 28, which has in the meantime been released from the lug 31. The gas is now generated in the second holder and the bell again rises, the lug 31 pushing up the tail 29 of the pawl 28 on its upward passage and the nose of the lug 47 yielding as it passes the crown-wheel. When the arm 33 strikes the cam-surface 36 of the rod 9, the lever 22 is depressed at one end and the opposite end of the same throws over the weighted lever system 23 24, thus opening the water communication 18 to the receptacle or generator-chamber, while the connecting-rod 52 closes the petcock 53. When the charge has been exhausted, the back-pressure valve 56 prevents the gas from flowing back through the pipe 55 and out at the water-tank or petcock. The exhausted holder or generator-receptacle may then be recharged, so that it will be ready for action the next time its arm 33 comes around. After the recharging the cocks and the protecting-caps should be reset.

In case any of the water-cocks leading to the generator-chambers should leak somewhat it is advisable to provide means for allowing any water which might enter the same to pass off at the bottom. This is effected by means of a drip-cock 53, having plug-lever 54, which is connected to a lever 51 of the cock 19 by means of a connecting-rod 52, so that when the water-feed cock is opened the petcock 53 will be closed to prevent the escape of gas. The gas generated passes off through a pipe 55, having a check-valve 56, to the gas-holder, which it enters above the water-level. In order to be able to feed the gas to the points of consumption in as dry a state as possible, the water underneath the bell is provided with a layer of oil 57 thereabove, thus preventing the contact of the gas with the surface of the water.

Although I have described in detail one form of the apparatus, I wish it to be understood that many of the details of construction could be varied in many ways without departing from the spirit of the invention. Thus, for instance, the pawl device for controlling the movement of the shaft 25 might be of any other suitable construction, the shaft 25 might be actuated by means of a torsional spring instead of the weight, and many other constructive alterations might be made.

The quality of acetylene gas produced by a gas-generator depends not only upon the purity of the calcium carbid, but also upon the means employed for its generation. On the face of it the proposition is an extremely simple one—bring calcium carbid and water together and you have acetylene; but simple as the problem seems at first glance both the inventors and the scientific world have found themselves involved in such a maze of perplexities in their attempts to solve the problem that literally hundreds of generators for acetylene have been brought forth. When water is admitted to a case of carbid in quantities sufficient to generate approximately sufficient gas for immediate consumption an amount of heat is created which effectually disposes of the question of utility of all this class of generators for even the smallest installation for house-lighting. The heat created by the insufficient supply of water is such as to make the generator chamber or receptacle become exceedingly hot, causing great internal pressure, which in connection with the heat will burst the receptacle if it is not sufficiently strong to withstand the pressure, and if it is strong enough to withstand such pressure then polymerization ensues, and the full extent of the gas-producing capacity of the carbid is not had. This system is not only wasteful, but also produces impure gas, having noxious and injurious gases commingled therewith. The reductions which take place therefore in all machines of this class produce not only serious waste, but also cause a diminution of light by the production of such gases other than acetylene. In the case of exceedingly small generators—such as bicycle-lamps, &c.—these objections are minimized, especially as the burners are always left open and undue pressure avoided. In the case, however, of house installations or other large class where the gas must necessarily be turned off every objection to generators of this class is increased and emphasized in direct ratio to the size of the apparatus. In machines wherein the water-supply rises to the carbid many difficulties are encountered, among which are that of so controlling the water-supply that no possible mishap to any part of the machine may result in accidentally admitting water to the carbid and thus producing an amount of gas greater than the gasometer will contain, the difficulty in controlling the spattering and foaming of the carbid after the water is admitted, the protection of the reserve carbid, not only from the spattering above mentioned, but also from the air or gas heavily charged with water-vapors due to the heat evolved in the formation of gas. If water is admitted to a large amount of carbid at a time, unless extraordinary precautions are taken sufficient heat is developed to polymerize the carbid and cause not only waste, but also the production of other and deleterious gases. It is true that this difficulty may be partially overcome by placing the carbid in large flat trays, so that only a thin layer of the carbid is submitted to the action of the water. In this case, however, the objections are so accentuated as to more than counterbalance its benefits. There is also to be seriously considered the difficulties of dealing with the residuum. In generators in which the carbid is introduced into the water it is with great difficulty, almost amounting to impossibility, that they may be automatic, economical, and cleanly at the same time. If the carbid is put into the water by hand, there seems to be a certain and disagreeable waste of the gas before the carbid can settle under the bell of the gasometer. It not only requires the presence of an attendant during the charging of the gasometer, but so much gas is wasted during the operation as to be a distinct and serious danger if carried on in a closed room, besides being disagreeable under any circumstances. The removal of the sludge from the gasometer is a dirty and disagreeable business, while so far all attempts to devise an automatic generator of this class have met with a very moderate amount of success. Carbid as it comes from the factory is in irregular shaped and sized lumps, which effectually precludes the idea of a regular automatic feed in small quantities at a time. If ground to powder or reduced to granular form, both the elements of waste and cost are prohibitive. If fed into the water in the holder or a separate generator, the admission of more than a very small quantity at a time causes so much spattering and foaming, as well as such a cloud of hot steam, as to imperil the next charge of carbid most seriously. Owing to these difficulties the present invention is intended to produce a generator wherein the carbid or other gas-producing agent may be put up at the factory in hermetically-sealed cases containing an amount of carbid which may be generated successfully and in amounts sufficient to fill a gas-holder with which they are intended to be used. These hermetically-sealed cases coming from the factory may be provided with portions capable of being punctured or otherwise opened within a generator-chamber, so that no deterioration may ensue, and the opening taking place within a closed generator in communication with the gas-holder all the gas emanating from the charge will be stored. By the present invention the cases are placed within the generator-chamber and punched or opened at different planes, which may preferably be at their upper and their lower portions, whereby openings which may be similar in mechanical character, yet differing in hydrostatic functions, are formed. Water is admitted to the generator-chamber at the same time that the cases are opened, whereupon the water will enter the case at a portion where the gas does not naturally most freely escape, and the gas will be permitted to escape at its most natural point without having to traverse the body of water within the generator-chamber, as would be the case were the gas compelled to escape at a lower point, and the escape of gas being permitted at the upper point no gas is trapped within the case. Therefore undue heating and internal pressure are prevented. Were such pressure present, the water would be prevented from entry and all the carbid above the punctures would be trapped in a vapor-bath rather than in water and be practically lost for the purpose of making gas. No impediment is offered to the rising of the water to the carbid as rapidly as it can be admitted to the generator. Thus it will be apparent that a device for forming in a carbid-case openings dissimilar in their hydrostatic functions—one for passing water into and the other for passing gas out of the case—has great advantages over devices wherein the laws of hydrostatics are disregarded or wherein the openings to the carbid-cases are made at such positions that water and gas are compelled to pass through the same openings and in opposite directions. After the complete development of the charge of carbid the generator-chamber may be opened and almost the entire residuum, which is in the nature of sludge, be removed therefrom with the case, making the handling of the apparatus more cleanly and agreeable. This system has the advantage over others in that a predetermined amount of carbid is placed in the can and fresh clean water is used for the development of that charge. After that charge has been properly developed the next charge has its supply of fresh water, whereas in the systems wherein the carbid is admitted to the water within the gasometer or other generator or the water rises to layers of carbid the water becomes saturated with lime and its efficiency impaired. Not only does the water become contaminated, but the lumps of carbid falling into the devices become embedded in the mud or sludge at the bottom of the generator and fail to develop rapidly. My invention, however, permits the rapid and efficient generation of the charge of carbid, permitting the gas to escape rapidly, and without exerting pressure within the generator permits it to escape from the generator in a drier form than is possible in the cases where the gas has to traverse the body of water, and owing to evenness of pressure the gas is purer and freer from undesirable combinations of elements, and no polymerization having taken place within the generator the residuum is not so foul-smelling as is the residuum of other generators.

Having described my invention, I claim—

1. In a gas-generator, the combination with a gas-holder having a part movable upon change of volume of gas therein, of a closed receptacle independent from said gas-holder, and adapted to contain both water and a case of gas-producing agent; a conduit between said gas-holder and receptacle; means for opening the case; means for supplying the receptacle with water; and devices controlled by the movable part of the gas-holder for operating the means for opening the case and for supplying water to the receptacle.

2. In a gas-generator, the combination with a gas-holder having a part movable upon change of volume of gas therein, of a closed receptacle; a conduit between the gas-holder and receptacle; means for supplying the receptacle with water; means for mounting or supporting a case of gas-producing agent within the receptacle; devices for puncturing the case at remote points; a device controlled by the movable part of the gas-holder for operating the puncturing devices and means also controlled by said movable part for causing the supply of water to enter the receptacle.

3. In an acetylene-gas generator, the combination with a gas-holder having a bell, of a closed receptacle for holding a case of carbid; means controlled by the bell for puncturing the carbid-case, and means also controlled by the bell as it closes, for supplying said receptacle with water.

4. In an acetylene-gas generator, the combination with a gas-holder, of a closed receptacle, capable of containing a case of carbid; a water-tank in communication with the receptacle; means for causing the water from the tank to pass into the receptacle; a tool for punching the carbid-case; and means operating automatically upon the reduction of the volume of gas in the gas-holder, for operating the tool.

5. In a gas-generator, the combination with a gas-holder, of a series of closed receptacles, each capable of containing or supporting one or more cases of gas-producing agent; devices for forming openings of dissimilar hydrostatic functions in each of the cases; and mechanism for actuating the opening devices of the receptacles successively.

6. In an acetylene-gas generator, the combination with a gas-holder having a bell, of a closed receptacle independent of the gas-holder, and capable of containing a carbid-case; a tool working through a wall of the receptacle and serving to perforate the carbid-case; and means for actuating said tool.

7. In an acetylene-gas generator, the combination with a gas-holder of a closed receptacle independent of the gas-holder, and capable of containing a carbid-case; a tool within the receptacle, and a tool working through a wall of the receptacle, said tools serving to perforate the carbid-case at separated points; and means for actuating said tools.

8. In a gas-generator, the combination with a receptacle, capable of containing a case of gas-producing agent; a punch operating through a wall of the receptacle and serving to perforate the case; a device for actuating the punch; a gas-holder; and a conduit for conveying the gas generated in the receptacle to said gas-holder.

9. In a gas-generator, the combination with a receptacle capable of receiving a case containing gas-producing agent; a punch for perforating the case; a shaft carrying means for operating said punch and normally locked against rotation; a gas-holder having a bell; a device connected to said bell for releasing the shaft; and means for actuating the shaft when released.

10. In a gas-generator, the combination with a punch for opening a case of gas-producing agent; a protector for preventing the punch from being operated except at the proper time; means for actuating the protector; and means for actuating the punch.

11. In a gas-generator, the combination with a receptacle, adapted to receive a case containing a gas-producing agent; a punch; means for actuating the punch; a protecting-cap for the punch; and means for withdrawing the cap prior to the operation of the punch.

12. In a gas-generator, the combination of a receptacle adapted to contain a case of gas-producing agent; a punch; a swinging protector; means for withdrawing the protector; and means for actuating the punch.

13. In a gas-generator, the combination of a receptacle, adapted to contain a case of gas-producing agent; a tool working through a wall of the receptacle and adapted to perforate the case; means for actuating the tool; and a movable protector for preventing the operation of the tool except at the proper time.

14. In a gas-generator, the combination of a receptacle carrying a punch and capable of containing a carbid-case; means normally sustaining the case above the punch; and means for forcing the case down upon the punch.

15. In a gas-generator, the combination of a receptacle carrying a punch and capable of containing a case; means normally sustaining the case above the punch; and means embodying a second punch for perforating the case and also forcing the same upon the first punch.

16. In a gas-generator, the combination with a receptacle, capable of holding a case containing a gas-producing agent, of a punch therein; means for normally holding the case out of contact with the punch; a punch working through a wall of the receptacle; and means in connection with the working punch for forcing the case upon the first punch.

17. In a gas-generator, the combination with a receptacle adapted to contain a case of carbid, of a punch in said receptacle; means for forcing the case against the punch; means for forcing the case away from the punch; and means for introducing water into the receptacle.

18. In a gas-generator, the combination with a receptacle adapted to contain a case of gas-producing agent, of a stationary punch therein; a movable punch working through a wall of the receptacle; means for forcing the case against the stationary punch; and means for actuating the movable punch.

19. In a gas-generator, the combination with a receptacle, adapted to contain a case of gas-producing agent; a device for perforating said case; a water-supply; means for controlling the supply of water to the receptacle; and a device actuated by the receptacle-perforating device for operating the means for controlling the supply of water.

20. The combination with a gas-holder, of a receptacle independent of the holder, capable of receiving a case of gas-producing agent; a conduit connecting the holder and receptacle; means for simultaneously perforating the case at different points; and means for supplying water to the receptacle at the time the case is perforated.

21. The combination with a gas-holder, of a closed receptacle capable of containing a case of carbid; a conduit between the receptacle and gas-holder; a stationary punch within the receptacle; a reciprocatory punch working through a wall of the receptacle; and means for introducing water to the receptacle.

22. The combination with a gas-holder, of a receptacle for receiving a case containing carbid; means for perforating said case; means for introducing water into the receptacle; a valve in the water-supply means and controlled by the means for perforating the case; and a conduit for conveying the generated gas to the gas-holder.

23. The combination with a gas-holder, of a receptacle; a conduit between the gas-holder and receptacle; means for supporting a carbid-case within the receptacle; means for supplying water to the receptacle; means for perforating the case at its top and at its bottom; and means for causing water to be supplied simultaneously with the perforating operation.

24. In a gas-generator, the combination of a closed receptacle for receiving a case containing carbid; a punch working through one end of the receptacle; means for actuating the punch; a lever moving with the punch; a water-supply pipe leading to the receptacle; and a valve in the water-supply pipe actuated by the lever.

25. In a gas-generator, the combination with a receptacle for receiving a carbid-case, of a water-supply pipe communicating therewith; a punch for perforating the case; and means for actuating the punch and controlling the water-supply.

26. In a gas-generator, the combination with a receptacle adapted to contain a carbid-case; a punch for perforating the case; a pivoted lever moving with the punch; a water-supply pipe communicating with the receptacle; a valve in the pipe actuated by the pivoted lever; and a weight for the valve.

27. The combination with the bell of a gas-holder, of a receptacle communicating with said holder and adapted to receive a case containing a charge of carbid, the gas from which will enter the gas-holder; a punch for perforating the carbid-case; means for actuating the punch; a water-supply conduit leading to the receptacle; and means carried by the bell for controlling the movement of the punch-actuating means.

28. The combination with a gas-holder, of a series of receptacles, each adapted to receive a carbid-case, in communication with the gas-holder; a series of punches; mechanism for actuating the punches; and means for enabling the bell to control said actuating mechanism for setting in operation punches for successively perforating the cases in the receptacles.

29. The combination with a gas-holder, of a series of receptacles, each independently in communication with the gas-holder, and each adapted to contain a carbid-case; a series of punches; a shaft; and a series of wipers disposed on the shaft at different angles, for successively actuating the punches to perforate the carbid-cases.

30. In a gas-generator, the combination with a rotary shaft carrying a wiper, of means normally tending to rotate said shaft; a stop for restraining the movement of the shaft; means for withdrawing the stop; a punch actuated by the wiper; and a receptacle adapted to contain a case to be perforated by the punch.

31. In a gas-generator the combination with a rotary shaft carrying a wiper, of means the tendency of which is normally to rotate said shaft; a ratchet carried by the shaft; a pawl engaging the ratchet; means for releasing the pawl; a punch actuated by the wiper when the shaft is released; and a receptacle adapted to contain a case to be perforated by the punch.

32. In a gas-generator, the combination, with a rotary shaft carrying a wiper, of a drum secured to the shaft; a rope carrying a weight, coiled on the drum; a ratchet secured to the shaft; a pawl in engagement with the ratchet; means for releasing the pawl; a punch operated by the wiper; a spring for returning the punch to its normal position; and a receptacle capable of holding a case containing a gas-producing agent, and through a wall of which receptacle the punch operates.

33. The combination with a punch, of means for actuating said punch; a hinged protector normally located over the punch; and a shaft carrying a wiper for withdrawing said protector.

34. In an acetylene-gas generator, the combination with the bell of a gas-holder, of a gas-tight receptacle adapted to receive a sealed carbid-containing case; a tank to supply the same with water; means within the receptacle and outside the gas-holder for puncturing the case when the contents of the latter is to be developed; and means released by the fall of the bell for operating the puncturing device in the receptacle and for establishing communication between the water-tank and the receptacle as the bell sinks below a certain level.

35. In an acetylene-gas generator, the combination with a gas-holder embodying a bell, of a series of receptacles each adapted to contain a case of carbid; and means in connection with each receptacle and controlled by the bell of the gas-holder for consecutively punching the carbid-case therein and feeding water to the receptacles.

36. In an acetylene-gas generator, the combination with a gas-holder and bell, of a series of separate receptacles to contain hermetically-sealed carbid-cases; means for puncturing the carbid-cases; a separate water-tank for each receptacle to contain the proper quantity of water to develop the carbid therein; and means actuated by each fall of the bell of the gas-holder below a certain point to puncture the carbid-case in and supply water to the receptacles consecutively.

37. In an acetylene-gas generator, the combination with a gas-holder and bell, of separate receptacles adapted to contain sufficient hermetically-sealed carbid to fill the bell with gas when the carbid is developed; a removable bottom plate for each of said receptacles having a punch; a spring adapted normally to hold a carbid-case above the punch; a movable punch; a stuffing-box to guide the same through the cover of the receptacle; a flange supported on the movable punch above the carbid-case; means for supplying water to each receptacle; and means operated at each fall of the bell below a certain level and serving to actuate the movable punch and to turn on the water-supply to said receptacle.

38. In an acetylene-gas generator, the combination, with a gas-holder and bell, of a series of complete receptacles mounted in proximity thereto; and each capable of containing a carbid-case; a rotary shaft mounted adjacent to the receptacles; a puncturing device for each receptacle; a series of striker-arms radially equidistant from each other on the shaft; means for rotating the shaft a part of a turn at each descent of the bell and thereby imparting a blow to the puncturing devices consecutively; means for supplying water to the receptacles; and means operating in connection with the puncturing devices for opening the water-supply to said receptacles.

39. The combination, with a gas-holder and bell, of a series of separate receptacles capable of containing sealed carbid-cases; means actuated by the bell for puncturing the cases consecutively; protecting-caps to cover the puncturing device; and means for consecutively withdrawing the caps before the puncturing mechanism is operated.

40. In an acetylene-gas generator, the combination with a gas-holder having a bell, of a series of receptacles for containing sealed carbid-cases; a puncturing device for each receptacle; a separate water-tank for each receptacle; means for consecutively operating one of the puncturing devices at each fall of the bell beyond a certain point.

41. In an acetylene-gas generator, the combination with a gas-holder having a bell, of a series of receptacles for containing sealed carbid-cases; a puncturing device for each receptacle; a separate water-tank for each receptacle; means for consecutively operating one of the puncturing devices at each fall of the bell beyond a certain point; a petcock at the bottom of each receptacle; and means controlled by the puncturing device for closing the petcock as soon as the puncturing device is operated.

42. In a generator, the combination with a receptacle capable of receiving, and retaining when closed, a sealed case containing a charge of gas-producing agent, of a closure for closing the receptacle; means for establishing communication to and from the charge at different vertical planes; and means acting independently of the action of the closure for actuating the communication-establishing means.

43. In a gas-generator, the combination with a receptacle capable of receiving a case, of means for perforating the case at both its upper and lower portions.

44. In a gas-generator, the combination with the bell of a gas-holder, of a gas-tight receptacle for holding a sealed case containing a gas-producing agent; a tank to supply the receptacle with a coöperative gas-producing agent; means within the receptacle for opening communication between the receptacle and the case at a plane where the coöperative agent may freely enter and also at a plane where the generated gas may freely escape; and means set in motion when the bell sinks below a predetermined level, for actuating the opening device and establishing communication between the tank and receptacle.

45. In a gas-generator, the combination with a receptacle adapted to contain both a case of gas-producing agent and also a coöperative agent, of means for establishing communication between the interior of the receptacle and the interior of the case at a plane where the coöperative agent may freely enter the case and also at a plane where the generated gas may freely escape from the case.

46. In a gas-generator, the combination with means for holding a case of gas-producing agent, of means for supplying a fluid coöperative agent; means for producing an entry for the coöperative agent into the case; and means for producing an exit for the gas from the case separate from the entry thereto.

GEORGE GREGORY SMITH.

Witnesses:

FRED. J. DOLE,

JOHN O. SEIFERT.